Jan. 25, 1949. W. M. ROBERDS 2,460,033
ELECTRICAL CONDENSER
Filed June 15, 1943

INVENTOR.
Wesley M. Roberds
BY H. S. Grover
ATTORNEY.

Patented Jan. 25, 1949

2,460,033

UNITED STATES PATENT OFFICE 2,460,033

ELECTRICAL CONDENSER

Wesley M. Roberds, Collingswood, N. J., assignor to Radio Corporation of America, a corporation of Delaware Application June 15, 1943, Serial No. 490,851

5 Claims. (Cl. 175—41)

This invention relates to new and useful improvements in electrical condensers and is particularly directed to condensers of the type having a solid dielectric and arranged for carrying extremely heavy current loads.

This patent application contains claims which are directed to a fixed condenser whereas, a divisional application Serial Number 705,469, filed October 24, 1946, contains claims directed to a method of molding a fixed condenser.

An object of this invention is to provide a condenser which is efficient in use and economical to manufacture.

Another object of this invention is to provide a condenser which will carry extremely heavy electrical current loads in an efficient manner without unduly increasing the volume and cost of the condenser over the devices which carry a normal or lesser current load.

Still another object of this invention is to provide a simple light weight combined air and water cooled condenser structure in which the electrodes and dielectrics are bound together by plastic insulation.

A feature of this invention is the novel arrangement of a solid dielectric or mica sheet and adjacent electrodes which extend substantially beyond the dielectric in such a manner as to efficiently carry away heat developed in the central portion of the condenser.

This invention is a further improvement over condensers of the type shown and described in the Pickard United States Patent 1,918,825.

In the condensers of the prior art, when such devices were intended to carry extremely heavy electrical current loads, expensive and complicated cooling apparatus have been provided.

It is a purpose of this invention to simplify the structural arrangement and cooling of the prior art condensers by arranging the mica sheets with alternately projecting metallic members which serve as electrode and cooling vanes. By alternately arranging for the maximum projection of the vanes beyond the dielectrics a metallic cooling duct can be fastened to the vanes for the passage of a cooling fluid therethrough.

It has been found that the losses in a high frequency condenser, which is capable of carrying extremely heavy current loads, are a direct function of the normal temperature of the active dielectric members under the working load conditions. The breakdown in high frequency condensers almost invariably occurs not in the mica but in the oil, wax or other surrounding dielectric medium and at a voltage less than the breakdown strength of the mica. Therefore, and if the temperature of the surrounding dielectric can be kept low, the condenser losses will likewise be low. By the arrangement of this condenser the thermal path is arranged to give maximum cooling to the dielectric members.

Condensers of this invention are very useful in very high frequencies (for example above 10 megacycles) where overheating is generally the limiting factor.

This invention will be described in more detail by the accompanying drawings in which.

Figure 1:
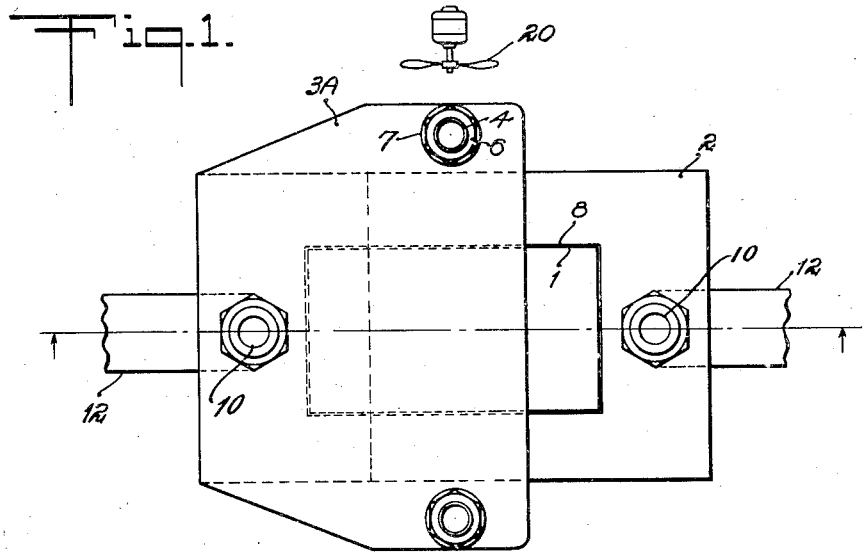
Fig. 1 is a plan view of an extreme loading condenser.
Figure 2:
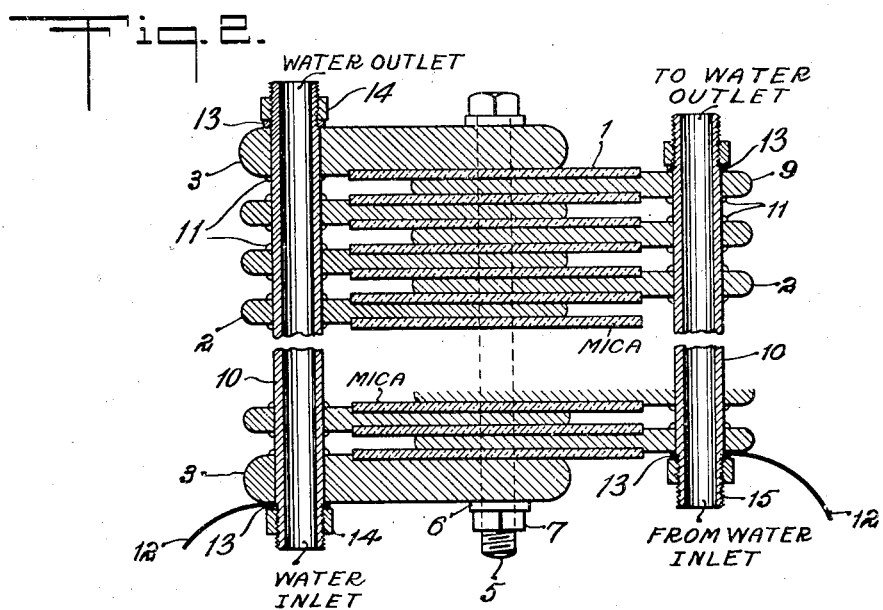
Fig. 2 is a cross-sectional view of Fig. 1.

Referring now in detail to Figs. 1 and 2 of the drawing, the dielectric sheets 1 (which are preferably those of rectilinear shaped mica of 1 to 5 mills thick) are positioned as shown on relatively thick metallic electrodes 2 which may be of any suitable metal having good thermal conductivity such as, for example, copper or aluminum when extreme light weight is required. Outside the stack of dielectric sheets 1 and the electrodes 2 are arranged outer or end electrodes 3 as shown which project beyond to the left. The end electrodes 3 are substantially similar in shape to electrode 2 except that they are much thicker and have projecting side portions 3A which have apertures 4 located therein for passing through a threaded metallic clamp stud 5 which is provided with washers 6 and nuts 7. The end electrodes 3 are preferably of heavy steel and copper plated. The electrodes 2 are alternately arranged to project beyond three edges of the dielectric sheets and are provided with slight depressed portions 8 or any other suitable means for retaining the mica sheets in position. At the extreme ends of electrodes 2 there are located apertures 9 which permit the passage of fluid cooling metallic tubes 10. The tubes 10 are soldered at 11 to electrodes 2 to furnish additional thermal conductivity. The tubes 10 also serve as electrical connections for the condenser, which connections may be taken off by any suitable means, such as, for example, passing a copper strip 12 beneath washers 13, the terminal and washers being bound together by means of suitable nuts 14. The ends of each one of the tubes 10 are threaded at 15 to be separately coupled with a circulating water supply (not shown). It will be noted that with this device a transfer of heat is made by conducting the heat from the copper electrodes to the fluid radiating tubes 10, and thus greater cooling is provided. The condenser of this invention may also be located within a casing containing oil wherein the oil bath acts merely as in insulator, and the tubes 10 provide the cooling. In such a device the casing would necessarily have to be provided with external connections for connecting the tubes 10 to the water cooling system.

Figure 3:
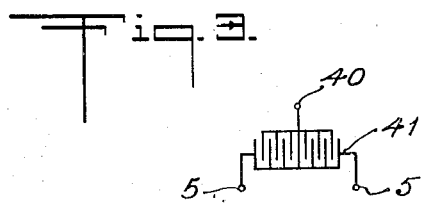
Fig. 3 is a diagram of a terminal arrangement of the condenser shown in Figs. 1 and 2.

The circuit or terminal arrangement of the condenser of this invention is shown by Fig. 3, wherein one group of electrodes 2 together with the outer electrodes 3A are all connected in parallel by the metallic tube 10 which is soldered at 11, the latter electrodes being provided with outer terminal connection studs 5. The other opposite group of electrodes are also connected in parallel by another tube 10 which is soldered at 11. A center terminal 40 is provided for making an external circuit terminal connection.

What I claim is:

1. An electric condenser comprising a plurality of solid dielectric mica sheets, a plurality of copper electrodes of greater area than said dielectric mica sheets positioned on each side thereof, said electrodes having a depressed portion of sufficient area to retain said solid dielectric mica sheets in a desired position, said electrodes being alternately arranged to extend beyond three edges of said solid dielectric mica sheets to provide cooling radiation therefor, a plurality of tubes passing through apertures in said copper electrodes and at right angles thereto, means for passing a cooling fluid through said tubes, and means to bind all of said solid dielectric mica sheets and said electrodes together to form a unitary condenser structure 2. An electric condenser comprising a casing containing oil, a plurality of solid dielectric sheets, a plurality of electrodes of greater area than said dielectric sheets positioned on each side thereof, said electrodes having a depressed portion of sufficient area to retain said solid dielectric mica sheets in a desired position, said electrodes being alternately arranged to extend beyond three edges of said dielectric sheets, a plurality of tubes passing through apertures in said electrodes at right angles thereto, means for passing a cooling fluid through said tubes, and means located within said casing to bind all of said dielectric sheets and electrodes together.

3. An electric condenser comprising a plurality of solid dielectric sheets, a plurality of metallic electrodes of greater area than said dielectric sheets positioned on each side thereof, each one of said electrodes having a depressed portion of sufficient area and depth to retain said solid dielectric sheets in a desired predetermined position, said electrodes being alternately arranged to extend beyond three edges of said solid dielectric sheets to provide cooling radiation therefor, a plurality of tubes passing through apertures in said metallic electrodes and at right angles thereto, means for passing a cooling fluid through said tubes, and means to bind all of said solid dielectric sheets and said electrodes together to form a unitary condenser structure.

4. An electric condenser comprising a plurality of solid dielectric sheets, a plurality of copper electrodes of greater area than said dielectric sheets positioned on each side thereof, each one of said electrodes having a depressed portion of sufficient area and depth to retain said solid dielectric sheets in a desired predetermined position, said electrodes being alternately arranged to extend beyond three edges of said solid dielectric sheets to provide cooling radiation therefor, a fluid cooling duct located at an end of some of said electrodes and being in thermal and electrical contact therewith, means to supply a blast of air to a portion of said copper electrodes, and means to bind all of said solid dielectric sheets and said electrodes together to form a unitary condenser structure.

5. An electric condenser comprising a plurality of solid dielectric sheets, a plurality of metallic electrodes of greater area than said dielectric sheets positioned on each side thereof, said electrodes having a depressed portion of sufficient area to retain said solid dielectric sheets in a desired position, said electrodes being alternately arranged to extend beyond three edges of said solid dielectric sheets to provide cooling radiation therefore, a plurality of metallic tubes passing through apertures in said electrodes and at right angles thereto, means for passing a cooling fluid through said tubes, and means to bind all of said solid dielectric sheets and said electrodes together to form a unitary condenser structure.

WESLEY M. ROBERDS.

REFERENCES CITED

The following references are of record in the file of this patent:

UNITED STATES PATENTS

| Number | Name | Date |
|---|---|---|
| 1,254,002 | Cook | Jan. 15, 1918 |
| 1,693,327 | Abrahams | Nov. 27, 1928 |
| 1,842,797 | Nyman | Jan. 26, 1932 |
| 1,918,825 | Pickard | July 18, 1933 |
| 2,075,891 | Dubilier | Apr. 6, 1937 |
| 2,326,151 | Marbury | Aug. 10, 1943 |

FOREIGN PATENTS

| Number | Country | Date |
|---|---|---|
| 335,829 | Great Britain | Oct. 2, 1930 |
| 395,420 | Great Britain | July 20, 1933 |